United States Patent
Nojima et al.

(10) Patent No.: US 7,043,165 B2
(45) Date of Patent: May 9, 2006

(54) MULTI-CHANNEL VIDEO OPTICAL TRANSMISSION SYSTEM, OPTICAL TRANSMITTER AND OPTICAL RECEIVER

(75) Inventors: Kazuhiro Nojima, Yokohama (JP); Seiho Kitaji, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 542 days.

(21) Appl. No.: 09/854,674

(22) Filed: May 15, 2001

(65) Prior Publication Data

US 2001/0053009 A1  Dec. 20, 2001

(30) Foreign Application Priority Data

May 17, 2000  (JP) ............................. 2000-144735

(51) Int. Cl.
H04B 10/04 (2006.01)
H04B 10/12 (2006.01)
H04B 10/08 (2006.01)
H04B 17/00 (2006.01)

(52) U.S. Cl. ........................................ 398/187; 398/32
(58) Field of Classification Search ................ 398/141, 398/182, 183, 187, 202, 214, 32, 66
See application file for complete search history.

(56) References Cited

U.S. PATENT DOCUMENTS

| 3,582,832 | A | * | 6/1971 | Junge et al. ................... 333/18 |
| 5,034,334 | A |   | 7/1991 | Flynn et al. .................... 437/8 |
| 6,031,648 | A | * | 2/2000 | Javitt et al. .................... 398/32 |
| 6,370,156 | B1 | * | 4/2002 | Spruyt et al. ................ 370/480 |

FOREIGN PATENT DOCUMENTS

JP  4-54034  2/1992
JP  4-57533  2/1992

OTHER PUBLICATIONS

F. Heismann et al., "Signal Tracking and Performance Monitoring in Multi-Wavelength Optical Networks", 22nd European Conference on Optical Communication—ECOC '96, 1996.*

* cited by examiner

Primary Examiner—Shi K. Li
(74) Attorney, Agent, or Firm—Connolly Bove Lodge & Hutz LLP

(57) ABSTRACT

In a multi-channel video optical transmission system comprising an optical transmitter and an optical receiver, a frequency modulation function incorporated pilot signal generating unit is provided in the optical transmitter to generate a pilot signal frequency-modulated. This frequency-modulated pilot signal is superimposed on a multi-channel video signal inputted thereto and is converted into a frequency-modulated signal in a frequency modulator, and is transmitted through an optical fiber to an optical receiver in a state converted into an optical signal in a semiconductor laser device. In the optical receiver, the optical signal is again converted into an electric frequency-modulated signal in a light-receiving device and, after amplified in an amplifier, is demodulated in a frequency demodulator, thereby regenerating the multi-channel video signal before the input to the frequency modulator. In this configuration, the pilot signal is frequency-modulated to modulate the frequency of a distortion occurring at frequencies corresponding to the sum of or difference between the frequencies of the pilot signal and the multi-channel video signal, thus making fringe patterns on a TV monitor disappear.

4 Claims, 7 Drawing Sheets

EXAMPLE OF MULTI-CHANNEL VIDEO SIGNAL

EXAMPLE OF VIDEO CARRIER AND DISTORTION

MULTI-CHANNEL VIDEO OPTICAL TRANSMISSION SYSTEM, OPTICAL TRANSMITTER AND OPTICAL RECEIVER

BACKGROUND OF THE INVENTION

1. Field of the Invention

The present invention relates to a multi-channel video optical transmission system designed to transmit, through an optical fiber, a multi-channel video signal for use in a cable television system (CATV), and further to an optical transmitter and optical receiver constituting the same multi-channel video optical transmission system.

2. Description of the Related Art

FIG. 3 is a block diagram showing an example of configuration of a conventional multi-channel video optical transmission system. In FIG. 3, an optical transmitter 12 forming a transmitting side of the multi-channel video optical transmission system is made up of a pilot signal generating section 11 for generating a sine-wave signal with a given frequency as a pilot signal, a frequency modulator (which will be referred to hereinafter as an "FM modulator") 2 for converting the pilot signal and an inputted multi-channel video signal, superimposed (multiplexed) on each other, into a frequency-modulated signal (which will be referred to hereinafter as an "FM signal) in batches, and a semiconductor laser device 3 for converting the FM signal into an optical signal and further for putting the optical signal out to an optical fiber 14.

In addition, an optical receiver 13 forming a receiving side of the multi-channel video optical transmission system is made up of a light-receiving device 4 for converting the optical signal, coming from the optical fiber 14, into an electric FM signal, an amplifier 5 for amplifying the FM signal outputted from the light-receiving device 4, a frequency demodulator (which will be referred to hereinafter as an "FM demodulator") 6 for frequency-demodulating the FM signal outputted from the amplifier 5 into a superimposed signal comprising the multi-channel video signal and the pilot signal to put it out as an output signal from the optical receiver 13, a pilot level detecting circuit 7 for extracting only the pilot signal from the output signal from the FM demodulator 6, and an alarm circuit 8 for activating or giving an alarm when the pilot signal level detected by the pilot level detecting circuit 7 shows an abnormal value.

Still additionally, the multi-channel video optical transmission includes a tuner 9 for selecting a signal corresponding to one channel from the multi-channel video signal forming the output signal of the receive side FM demodulator 6 to convert it into a base band video signal and a TV monitor 10 for demodulating the base band video signal, outputted from the tuner 9 to display the demodulated signal.

Secondly, a description will be given hereinbelow of a concrete operation of this multi-channel video optical transmission system. In the optical transmitter 12 forming the transmitting side of the multi-channel video optical transmission system, a sine-wave signal with a given frequency, i.e., a pilot signal, outputted from the pilot signal generating section 11 is superimposed on an inputted multi-channel video signal, and this pilot signal superimposed multi-channel video signal is inputted to the FM modulator 2 to be converted into an FM signal. This FM signal is inputted to the semiconductor laser device 3 to be converted into an optical signal and then transmitted through the optical fiber 14 to the optical receiver 13 on the receive side.

In the optical receiver 13, the inputted optical signal is again converted into an electric FM signal in the light-receiving device 4 and then amplified in the amplifier 5. Following this, the amplified FM signal is inputted to the FM demodulator 6, thereby producing the original pilot signal superimposed multi-channel video signal corresponding to the signal before the input to the FM modulator 2.

In the meantime, the pilot level detecting circuit 7 fetches only the pilot signal to detect the occurrence or non-occurrence of an abnormality in pilot signal level, and if detecting the abnormality, outputs an abnormality detection signal to the alarm circuit 8 which in turn, activates an alarm. This permits the confirmation on the occurrence or non-occurrence of the abnormality in the optical transmitter 12, the optical receiver 13 or the optical fiber 14.

Moreover, the tuner 9 makes channel-selection from the multi-channel video signal outputted from the optical receiver 13, and the TV monitor 10 connected to the tuner 9 displays a desired channel video signal thereon.

However, in a case in which an input current (or input voltage)-vs-output frequency characteristic in the FM modulator 2 of the optical transmitter 12 shows non-linearity or in a case in which an input frequency-vs-output voltage characteristic in the FM demodulator 6 of the optical receiver 13 shows non-linearity, the above-mentioned configuration creates a problem in that intermodulation distortion (which will be referred to hereinafter as "distortion") generally called CSO or CTB occurs in the multi-channel video signal outputted from the FM demodulator 6.

Likewise, in a case in which a group delay deviation occurs in the semiconductor laser device 3 of the optical transmitter 12 or in the light-receiving device 4 and amplifier 5 of the optical receiver 13, distortion occurs in the multi-channel video signal outputted from the FM demodulator 6, thus resulting in the occurrence of distortion in each channel band. In particular, in the case of a multi-channel video optical transmission system including a pilot signal, distortion occurs in the pilot signal and in the multi-channel video signal.

FIG. 4 is an illustration of a spectrum of a multi-channel video signal comprising a multi-channel video signal and a pilot signal superimposed on a frequency axis, and FIG. 5 is an enlarged spectrum illustration of one-channel video carrier and distortion in the multi-channel video signal shown in FIG. 4.

When the transmission of the multi-channel video signal shown in FIG. 4 takes place, in the output of the FM demodulator 6, distortion occurs at a frequency corresponding to the sum of or difference between each channel frequency and the pilot signal frequency. That is, as FIG. 5 shows, if the frequency of the distortion stemming from the pilot signal exists within the a video band of a video channel, when the picture is demodulated in the TV monitor 10, fringes (oblique fringes, horizontal fringes, vertical fringes or the like) appear in the picture, which interfere with the picture display. In the case shown in FIG. 5, distortion stemming from the pilot signal occurs at a frequency (fn−fp) existing within the video band on a video carrier with a frequency fa, and a fringe pattern appears on a video screen.

SUMMARY OF THE INVENTION

The present invention has been developed with a view to solving these problems, and it is therefore an object of the present invention to prevent fringes (stripes) from appearing in a picture on a TV monitor due to distortion at a frequency corresponding to the sum of or difference between a pilot signal frequency and each channel frequency of a multi-channel video signal.

For this purpose, in accordance with the present invention, in a multi-channel video optical transmission system made to convert a multi-channel video signal into an optical signal in an optical transmitter and transmit the converted optical signal from the optical transmitter through an optical fiber to an optical receiver, the optical transmitter comprises pilot signal generating means for generating a pilot signal to be superimposed on the multi-channel video signal inputted, frequency modulating means for modulating the pilot signal superimposed multi-channel video signal into a frequency-modulated signal in batches, and electrical-optical converting means for converting the frequency-modulated signal into an optical signal and further for putting the converted optical signal out to the optical fiber, while the optical receiver comprises optical-electrical converting means for receiving the optical signal transmitted through the optical fiber to convert the received optical signal into an electric frequency-modulated signal, amplifying means for amplifying the frequency-modulated signal obtained by the optical-electrical converting means, and frequency demodulating means for frequency-demodulating the frequency-modulated signal amplified by the amplifying means into a pilot signal superimposed multi-channel video signal. In this configuration, the pilot signal generating means has a frequency modulation function to modulate the frequency of the pilot signal for modulating the frequency of an intermodulation distortion occurring at frequencies corresponding to the sum of and difference between the frequency of each carrier of the multi-channel video signal and the frequency of the pilot signal.

That is, in the multi-channel video optical transmission system according to the present invention, the pilot signal generating means of the optical transmitter additionally has the frequency modulation function to frequency-modulate the pilot signal generated therein. This can make fringes (oblique fringes, horizontal fringes, vertical fringes, or the like) in a picture invisible which stems from distortions occurring at frequencies corresponding to the sum of or difference between the frequency of the pilot signal and the frequency of the multi-channel video signal. Accordingly, even if intermodulation distortions occur between the pilot signal and the multi-channel video signal, at the demodulation of a picture in a TV monitor, fringe patterns such as oblique fringes, horizontal fringes and vertical fringes disappear (become invisible) on the screen.

Furthermore, in accordance with the present invention, in a multi-channel video optical transmission system made to convert a multi-channel video signal into an optical signal in an optical transmitter and transmit the converted optical signal from the optical transmitter through an optical fiber to an optical receiver, the optical transmitter comprises pilot signal generating means for generating a pilot signal to be superimposed on the multi-channel video signal inputted, and electrical-optical converting means for converting the pilot signal superimposed multi-channel video signal into an optical signal and further for putting the converted optical signal out to the optical fiber, while the optical receiver comprises optical-electrical converting means for receiving the optical signal transmitted through the optical fiber to convert the received optical signal into an electric signal corresponding to a pilot signal superimposed multi-channel video signal, and amplifying means for amplifying the electric signal corresponding to the pilot signal superimposed multi-channel video signal obtained by the optical-electrical converting means. In this configuration, the pilot signal generating means has a frequency modulation function to modulate the frequency of the pilot signal for modulating the frequency of an intermodulation distortion occurring at frequencies corresponding to the sum of and difference between the frequency of each carrier of the multi-channel video signal and the frequency of the pilot signal.

With this configuration, the multi-channel video optical transmission system is capable of solving the above-mentioned fringe problem without using the frequency modulating means in the optical transmitter and the frequency demodulating means in the optical receiver. That is, the generated pilot signal is frequency-modulated by the additional frequency modulation function of the pilot signal generating means of the optical transmitter, thus making invisible fringe patterns in a picture which stems from distortions occurring at frequencies corresponding to the sum of or difference between the frequency of the pilot signal and the frequency of the multi-channel video signal.

Still furthermore, in accordance with the present invention, there is provided an optical transmitter for use in a multi-channel video optical transmission system, which converts a multi-channel video signal into an optical signal and transmits the converted optical signal through an optical fiber to an optical receiver, the optical transmitter comprising pilot signal generating means for generating a pilot signal to be superimposed on the multi-channel video signal inputted, frequency modulating means for modulating the pilot signal superimposed multi-channel video signal into a frequency-modulated signal in batches, and electrical-optical converting means for converting the frequency-modulated signal into an optical signal and further for putting the converted optical signal out to the optical fiber. In this configuration, the pilot signal generating means has a frequency modulation function to modulate the frequency of the pilot signal for modulating the frequency of an intermodulation distortion occurring at frequencies corresponding to the sum of and difference between the frequency of each carrier of the multi-channel video signal and the frequency of the pilot signal.

In addition, in accordance with the present invention, there is provided an optical receiver for use in a multi-channel video transmission system, which receives a multi-channel video signal, converted into an optical signal in an optical transmitter, through an optical fiber, the optical receiver comprising optical-electrical converting means for receiving the optical signal transmitted through the optical fiber to convert the received optical signal into an electric frequency-modulated signal, with the optical signal being produced in a manner that, at the conversion, a pilot signal is superimposed on the multi-channel video signal and the frequency of the pilot signal is modulated by a frequency modulation function of the optical transmitter for modulating the frequency of an intermodulation distortion occurring at frequencies corresponding to the sum of and difference between the frequency of each carrier of the multi-channel video signal and the frequency of the pilot signal, amplifying means for amplifying the frequency-modulated signal obtained by the optical-electrical converting means, and frequency demodulating means for frequency-demodulating the frequency-modulated signal amplified by the amplifying means into a pilot signal superimposed multi-channel video signal.

Still additionally, in accordance with the present invention, there is provided an optical transmitter for use in a multi-channel video optical transmission system, which converts a multi-channel video signal into an optical signal and transmits the converted optical signal through an optical fiber to an optical receiver, the optical transmitter comprising pilot signal generating means for generating a pilot signal to be superimposed on the multi-channel video signal inputted, and electrical-optical converting means for converting the pilot signal superimposed multi-channel video signal into an optical signal and further for putting the converted optical signal out to the optical fiber. In this configuration, the pilot signal generating means has a frequency modulation function to modulate the frequency of the pilot signal for modulating the frequency of an intermodulation distortion occurring at frequencies corresponding to the sum of and difference between the frequency of each carrier of the multi-channel video signal and the frequency of the pilot signal.

Moreover, in accordance with the present invention, there is provided an optical receiver for use in a multi-channel video transmission system, which receives a multi-channel video signal, converted into an optical signal in an optical transmitter, through an optical fiber, the optical receiver comprising optical-electrical converting means for receiving the optical signal transmitted through the optical fiber to convert the received optical signal into an electric signal in which a pilot signal is superimposed on the multi-channel video signal, with the optical signal being produced in a manner that the frequency of the pilot signal is modulated by a frequency modulation function of the optical transmitter for modulating the frequency of an intermodulation distortion occurring at frequencies corresponding to the sum of and difference between the frequency of each carrier of the multi-channel video signal and the frequency of the pilot signal, and amplifying means for amplifying the electric signal obtained by the optical-electrical converting means.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
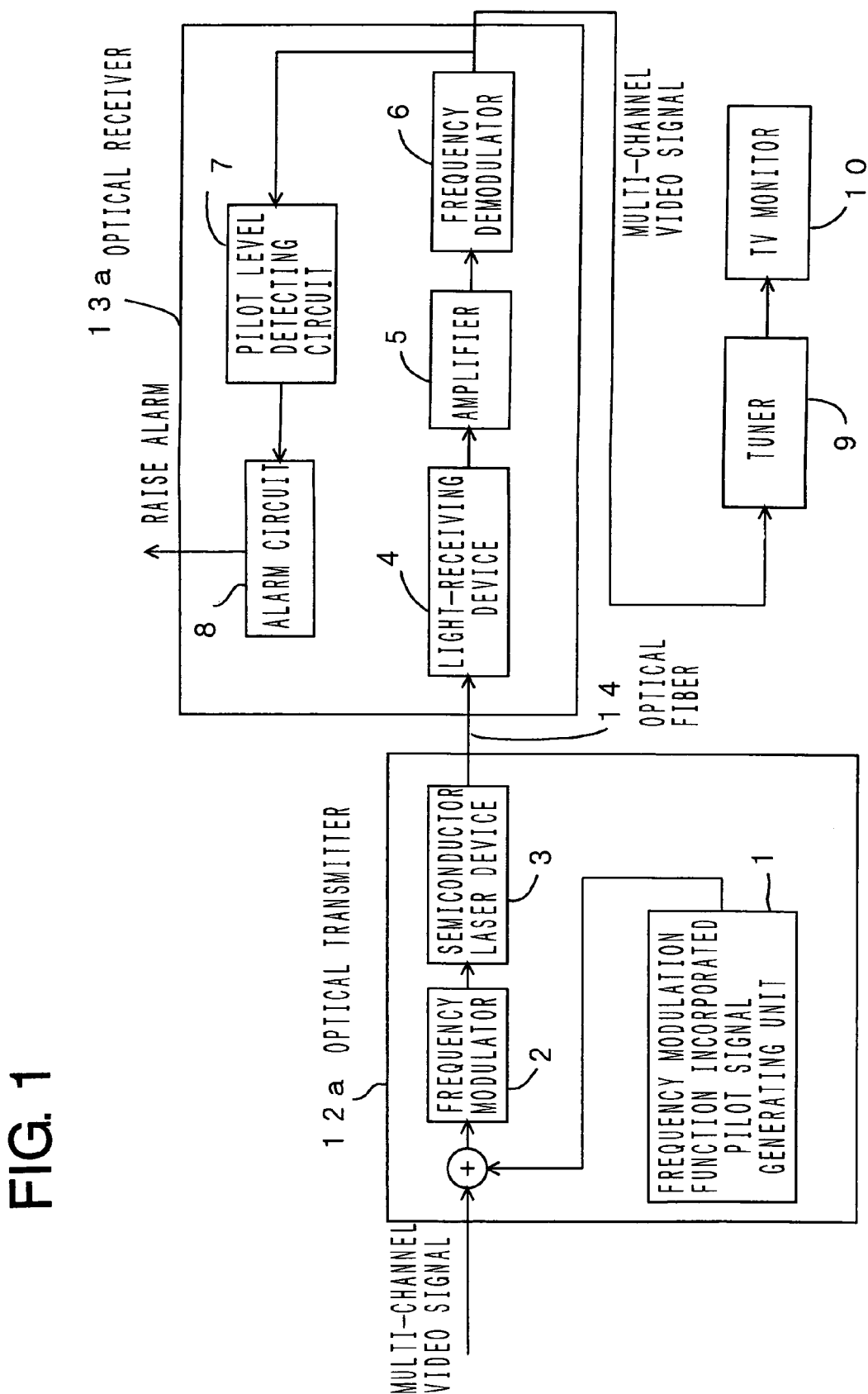
FIG. 1 is an illustration of a configuration of a multi-channel video optical transmission system according to a first embodiment of the present invention.

With reference to the drawings, a description will be given hereinbelow of multi-channel video optical transmission systems according to embodiments of the present invention. The description will start with a multi-channel video optical transmission system according to a first embodiment of the invention. FIG. 1 is an illustration of a configuration of the multi-channel video optical transmission system according to the first embodiment.

Figure 3:
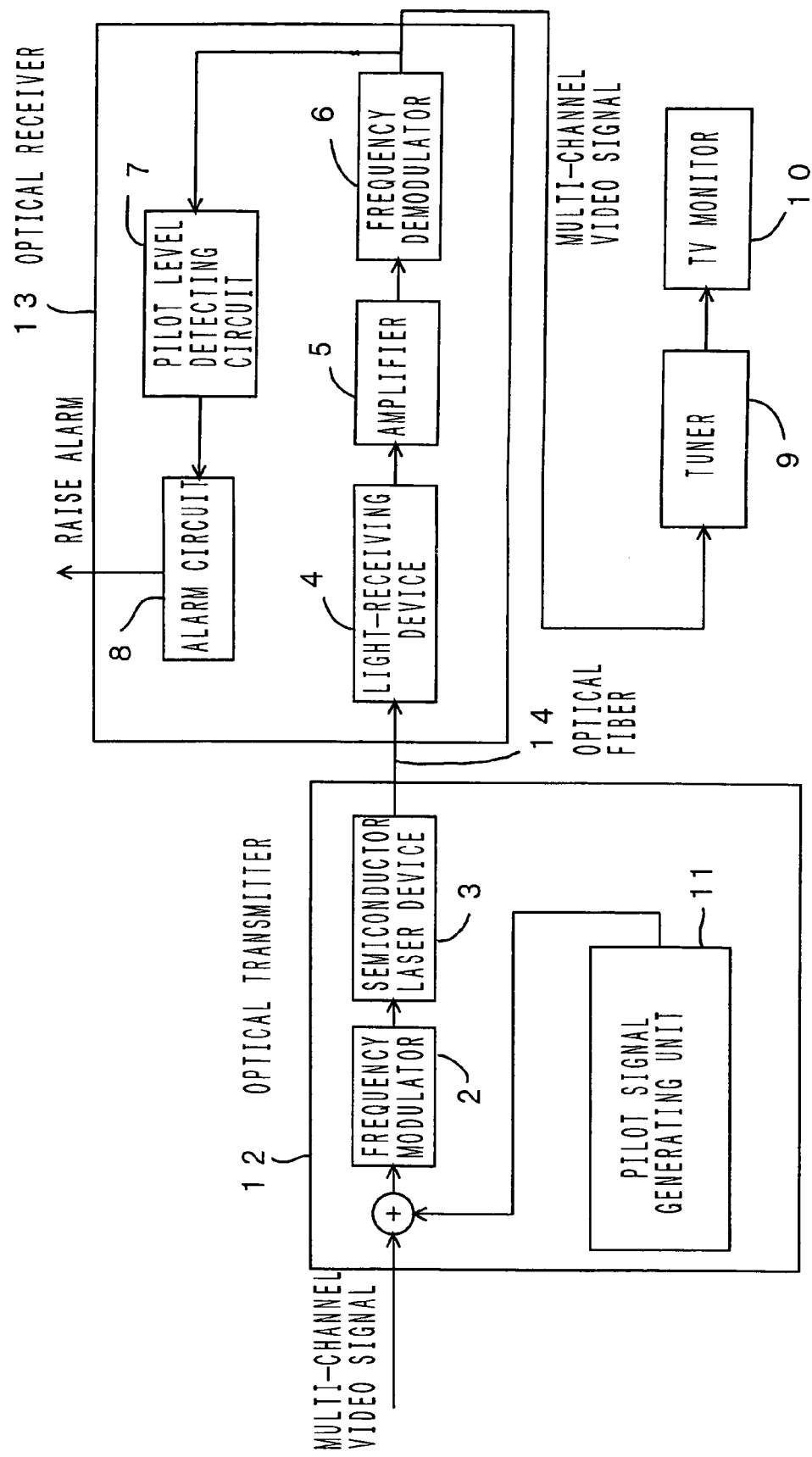
FIG. 3 is a block diagram showing a configuration of a conventional multi-channel video optical transmission system.
Figure 4:
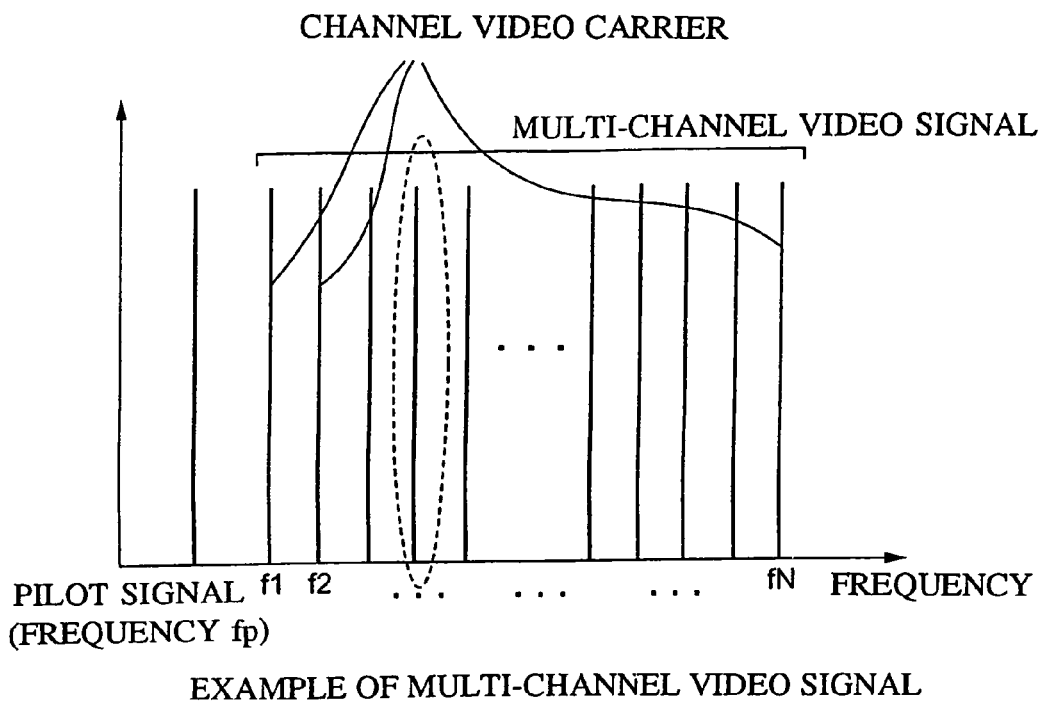
FIG. 4 is an illustration of a spectrum of a multi-channel video signal comprising a multi-channel video signal and a pilot signal superimposed on a frequency axis.
Figure 5:
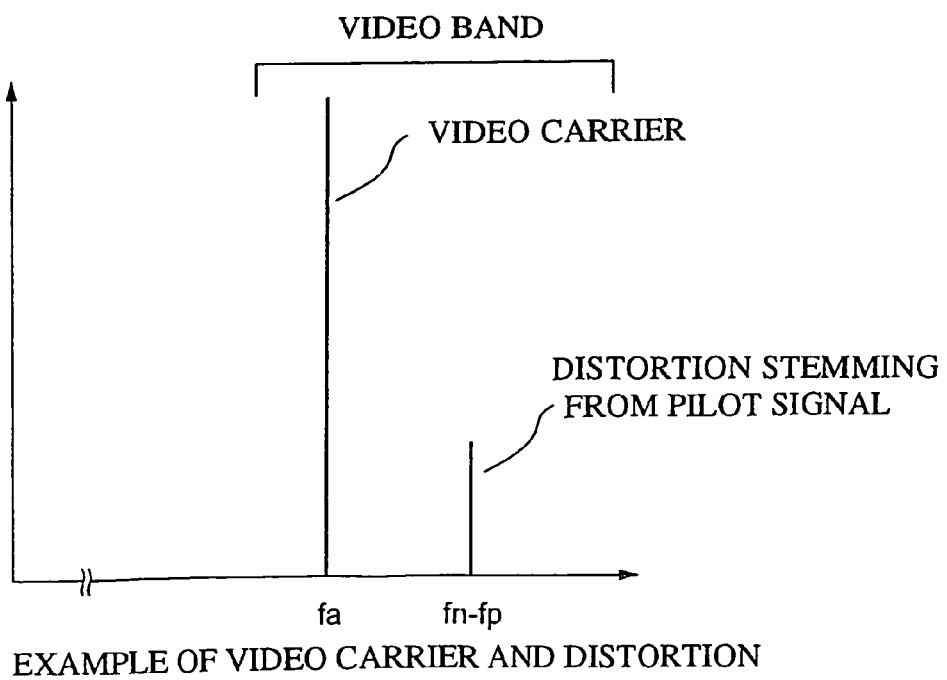
FIG. 5 is an enlarged spectrum illustration of one-channel video carrier and distortion in the multi-channel video signal shown in FIG. 4.

As FIG. 1 shows, in the multi-channel video optical transmission system according to the first embodiment, a pilot signal generating unit 1 with a frequency modulation function is provided in place of the pilot signal generating section 11 of the conventional configuration shown in FIG. 3. The frequency modulation function incorporated pilot signal generating unit 1 is for, in addition to generating a pilot signal, frequency-modulating the pilot signal generated. This makes invisible fringes (oblique fringes, horizontal fringes, vertical fringes, or the like) in a picture stemming from distortions occurring at frequencies corresponding to the sum of or difference between the frequencies of the pilot signal and a multi-channel video signal inputted.

In FIG. 1, an optical transmitter 12a forming the transmitting side of the multi-channel video optical transmission system is made up of the frequency modulation function incorporated pilot signal generating unit 1 for outputting a frequency-modulated pilot signal having a given intermediate frequency, a frequency modulator (FM modulator) 2 for converting a signal in which the pilot signal is superimposed on a multi-channel video signal, into a frequency-modulated signal (FM signal) in batches, and a semiconductor laser device 3 for converting the FM signal into an optical signal.

In addition, an optical receiver 13a forming the receiving side of the multi-channel video optical transmission system is composed of a light-receiving device 4 for again converting the optical signal into an electric FM signal, an amplifier 5 for amplifying the electric FM signal outputted from the light-receiving device 4, an FM demodulator 6 for frequency-demodulating the FM signal to output a pilot signal superimposed multi-channel video signal, a pilot level detecting circuit 7 for monitoring a strength level of the pilot signal of the pilot signal superimposed multi-channel video signal outputted from the FM demodulator 6, and an alarm circuit 8 for activating an alarm when the pilot level detecting circuit 7 has detected an abnormal pilot level.

Still additionally, there are provided a tuner 9 for selecting a desired channel from the output signal of the optical receiver 13 to output a video signal of a base band and a TV monitor 10 for demodulating the base band video signal to display a picture.

Secondly, a detailed description will be given hereinbelow of an operation of the multi-channel video optical transmission system according to the first embodiment shown in FIG. 1.

In the optical transmitter 12a forming the transmitting side of this multi-channel video optical transmission system, a frequency-modulated pilot signal with an intermediate frequency outputted from the frequency modulation function incorporated pilot signal generating unit 1 is superimposed on a multi-channel video signal inputted, and the pilot signal superimposed multi-channel video signal is inputted to the FM modulator 2 to be converted into an FM signal.

Moreover, this FM signal is inputted to the semiconductor laser device 3 to be converted into an optical signal, and this optical signal is transmitted through the optical fiber 14 to the optical receiver 13*a* on the receive side. In the optical transmitter 13*a*, the optical signal is again converted into an electric FM signal in the light-receiving device 4 and is amplified in the amplifier 5. In addition, this FM signal is demodulated in the FM demodulator 6, thereby regenerating the original pilot signal superimposed multi-channel video signal before the input to the FM modulator 2.

Still moreover, the pilot level detecting circuit 7 fetches only the pilot signal to detect its level and notifies the alarm circuit 8 of whether or not the level is abnormal. The alarm circuit 8 activates an alarm if the level detected by the pilot level detecting circuit 7 is abnormal, thereby enabling the confirmation on whether or not abnormality has occurred in the optical transmitter 12*a*, the optical receiver 13*a* and the optical fiber 14.

Furthermore, the multi-channel video signal outputted from the optical receiver 13*a* is channel-selected in the tuner 9 to select a desired-channel video signal which in turn, appears on the TV monitor 10.

In this way, in the multi-channel video optical transmission system according to the first embodiment, the frequency modulation of a pilot signal suppresses the fringes of a picture on the TV monitor 10 stemming from the distortion occurring at frequencies corresponding to the sum of or difference between the frequencies of the pilot signal and the multi-channel video signal.

Figure 8:
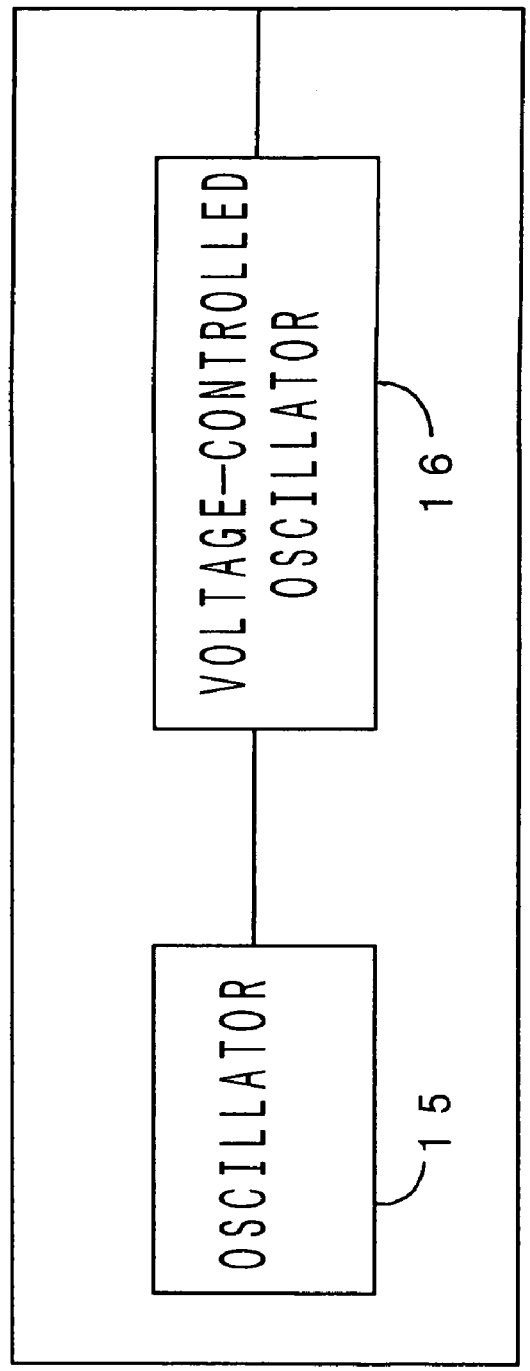
FIG. 8 is an illustration of a configuration of a pilot signal generating unit including a frequency modulation function.

The FM modulation function incorporated pilot signal generating unit 1 according to the first embodiment is, as shown in FIG. 8, composed of an oscillator 15 for outputting a signal for the frequency modulation of a pilot signal and a voltage-controlled oscillator 16 for varying the frequency of the pilot signal in accordance with a signal voltage outputted from the oscillator 15. In this configuration, on the basis of a signal outputted from the oscillator 15 which makes oscillation of a frequency of approximately 100 Hz to 100 kHz, the voltage-controlled oscillator 16 modulates the pilot signal frequency. Thus, the frequency modulation of the pilot signal is achievable. The configuration shown in FIG. 8 is also applicable to not only a frequency modulation function incorporated pilot signal generating unit according to a second embodiment which will be described hereinbelow but also all frequency modulation function incorporated pilot signal generating units according to the present invention.

Figure 2:
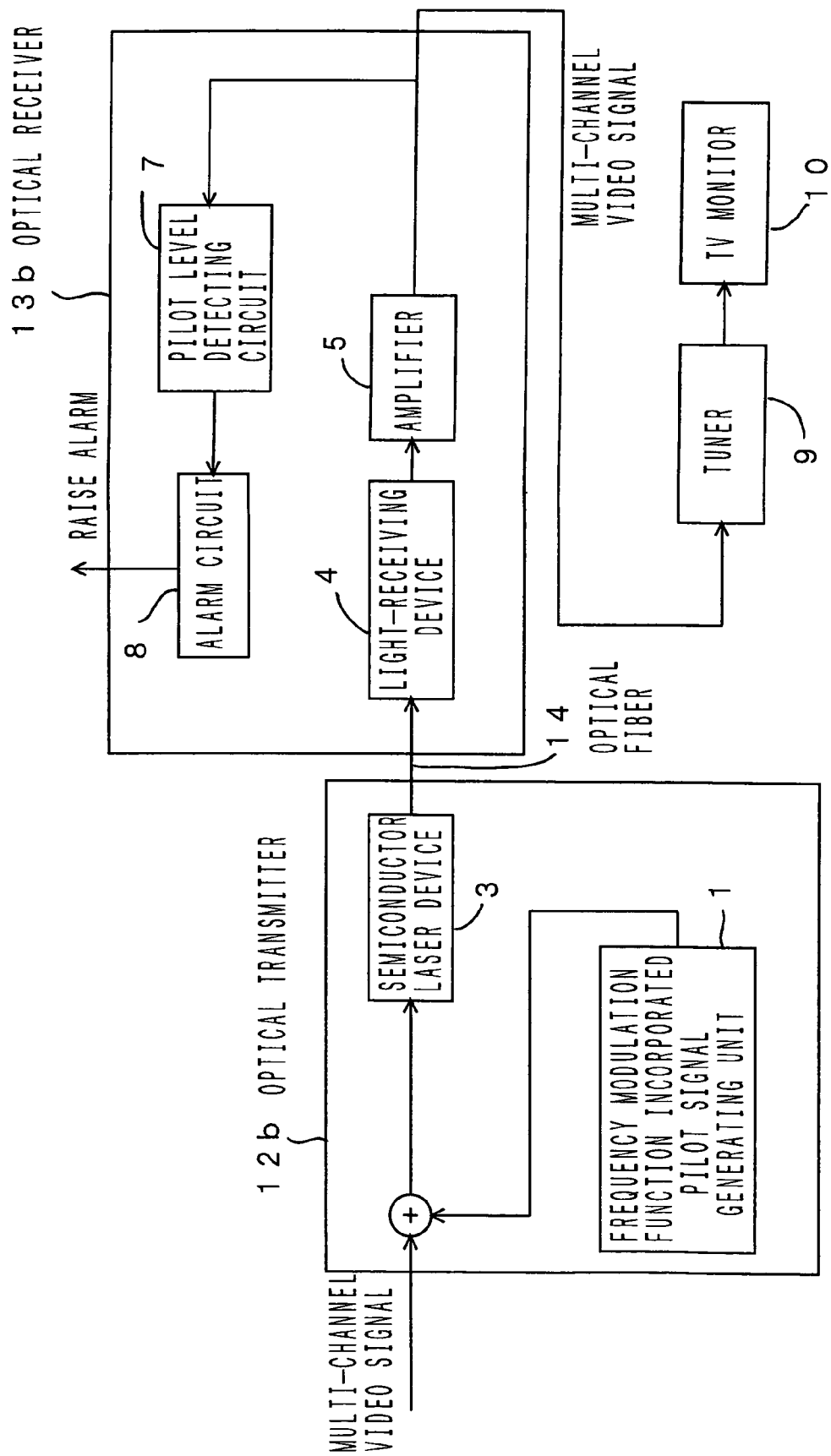
FIG. 2 is an illustration of a configuration of a multi-channel video optical transmission system according to a second embodiment of the present invention.

Secondly, a description will be given hereinbelow of a multi-channel video optical transmission system according to a second embodiment of the present invention. FIG. 2 is an illustration of a configuration of the multi-channel video optical transmission system according to the second embodiment of the present invention.

In the multi-channel video optical transmission system according to the second embodiment, the FM modulator 2 of the optical transmitter 12*a* and the FM demodulator 6 of the optical receiver 13*a* in the first embodiment are not used unlike the configuration shown in FIG. 1. This multi-channel video optical transmission system according to the second embodiment is the same as the multi-channel video optical transmission system according to the first embodiment in that the frequency modulation function incorporated pilot signal generating unit 1 is provided to modulate the frequency of the pilot signal generated. Likewise, with this configuration, it is possible to prevent fringes (stripes) from appearing due to distortion at a frequency corresponding to the sum of or difference between a pilot signal frequency and each channel frequency of a multi-channel video signal.

That is, in the multi-channel video optical transmission system according to the second embodiment, an optical transmitter 12*b* on the transmitting side is made up of the frequency modulation function incorporated pilot signal generating unit 1 for outputting a frequency-modulated pilot signal with a given intermediate frequency and the semiconductor laser device 3 for converting a pilot signal superimposed multi-channel video signal into an optical signal.

On the other hand, an optical receiver 13*b* on the receiving side is made up of the light-receiving device 4 for converting the optical signal into an electric signal in which the pilot signal is superimposed on the multi-channel video signal, the amplifier 5 for amplifying the electric pilot signal superimposed multi-channel video signal outputted from the light-receiving device 4, the pilot level detecting circuit 7 for monitoring the strength level of the pilot signal in the pilot signal superimposed multi-channel video signal outputted from the amplifier 5, and the alarm circuit 8 for giving an alarm when the pilot level detected by the pilot level detecting circuit 7 shows abnormality.

In addition, the multi-channel video optical transmission system according to the second embodiment includes the tuner 9 for selecting a desired channel signal from the output signal of the optical receiver 13*b* to output a base band video signal, and the TV monitor 10 for demodulating the base band video signal to display it.

A description will be given hereinbelow of a concrete operation of the multi-channel video optical transmission system according to the second embodiment. In the optical transmitter 12*b* forming the transmitting side of this multi-channel video optical transmission system, a pilot signal outputted from the frequency modulation incorporated pilot signal generating unit 1, which issues a frequency-modulated pilot signal with a given intermediate frequency, is superimposed on a multi-channel video signal inputted from the external, and this pilot signal superimposed multi-channel video signal is inputted to the semiconductor laser device 3 to be converted into an optical signal. This optical signal is transmitted through the optical fiber 14 to the optical receiver 13*b* on the receiving side.

In the optical receiver 13*b*, the light-receiving device 4 again converts the optical signal into an electric signal in which the pilot signal is superimposed on the multi-channel video signal, and the amplifier 5 amplifies the pilot signal superimposed multi-channel video signal, thereby providing a pilot signal superimposed multui-channel video signal.

Moreover, the pilot level detecting circuit 7 derives only the pilot signal for detecting its strength level and transmits, to the alarm circuit 8, information on whether that level is abnormal or not. The alarm circuit 8 activates an alarm at the abnormality of the detection level, thereby enabling checking the abnormality in the optical transmitter 12*b*, the optical receiver 13*b* and the optical fiber 14.

The multi-channel video signal outputted from the optical receiver 13*b* is channel-selected in the tuner 9 so that a desired channel video signal is selected and displayed on the TV monitor 10.

In this way, in the multi-channel video optical transmission system according to the second embodiment, the frequency modulation of a pilot signal suppresses the fringes of a picture on the TV monitor 10 stemming from the distortion occurring at frequencies corresponding to the sum of or difference between the frequencies of the pilot signal and the multi-channel video signal.

According to the above-described first and second embodiments of the present invention, in order to frequency-modulate a pilot signal generated, the frequency modulation function incorporated pilot signal generating unit 1 is used as shown in FIGS. 1 and 2 in place of the conventional pilot signal generating unit 1 shown in FIG. 3. This substantially removes the fringes of a picture stemming from the distortion occurring at frequencies corresponding to the sum of or difference between the frequencies of the pilot signal and the multi-channel video signal.

Figure 6:
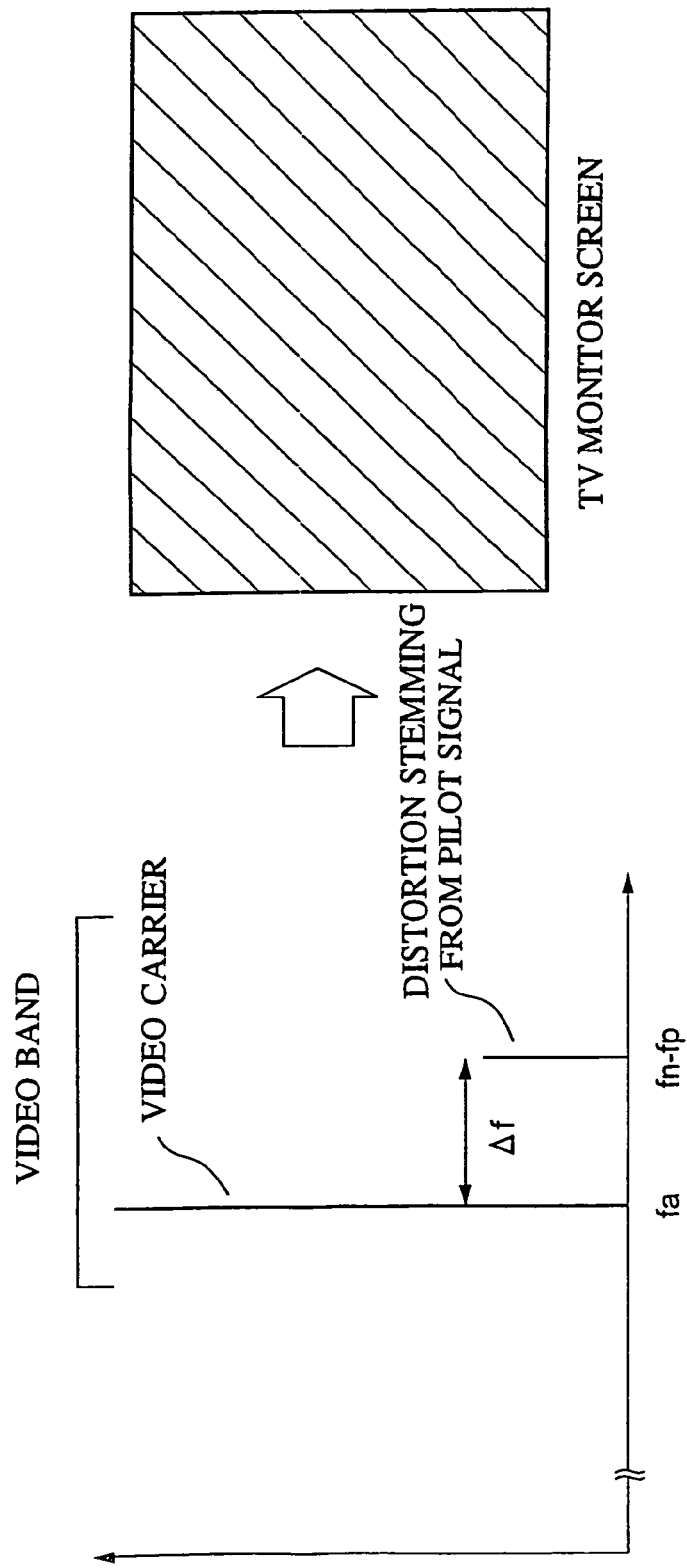
FIG. 6A is an illustration of a distortion spectrum in a conventional multi-channel video optical transmission system.
FIG. 6B is an illustration of an example of a picture, in which oblique fringes occurs, on a TV monitor.

FIGS. 6A and 6B are illustrations for explaining a picture and a distortion on a TV monitor in the conventional multi-channel video optical transmission system, and FIG. 6A shows a spectrum on a video carrier and a generated distortion while FIG. 6B shows an example of a picture including oblique fringes on the TV monitor. In FIG. 6A, the fringe pattern in the picture in FIG. 6B varies in angle in accordance with the difference (Δf) between the frequency fa of the video carrier and the frequency (fn–fp) of the distortion.

Figure 7:
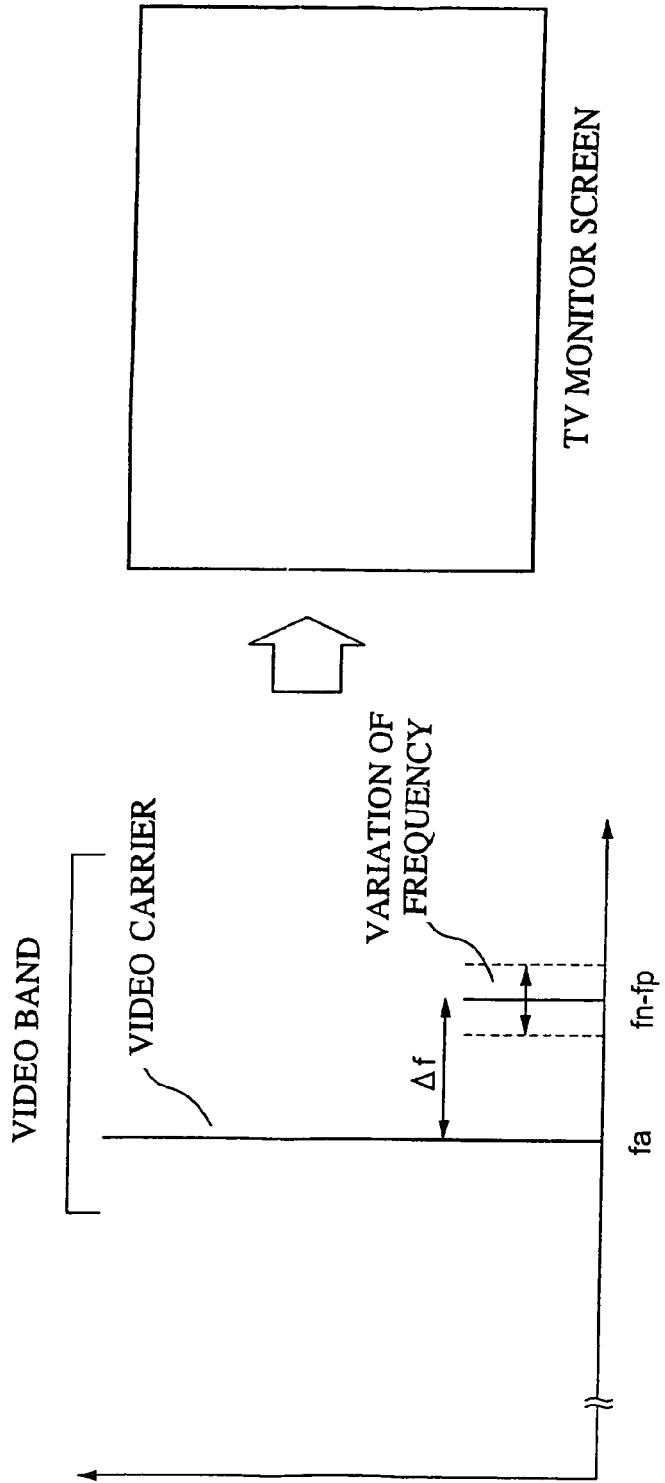
FIG. 7A is an illustration of a distortion spectrum in a multi-channel video optical transmission system according to the present invention.
FIG. 7B is an illustration of an example of a picture on a TV monitor.

FIGS. 7A and 7B are illustrations for explaining a picture and a distortion on a TV monitor in the multi-channel video optical transmission systems according to the present invention. According to the invention, owing to the frequency modulation of a pilot signal, the distortion occurs at the sum of or difference between the frequencies of a pilot signal and a video carrier signal. In this case, as FIG. 7A shows, the frequency difference Δf varies because the distortion is also frequency-modulated. For this reason, the angle of the fringes on the TV monitor 10 shown in FIG. 6B varies at all times, and when the modulation frequency of the frequency-modulated pilot signal is high, the fringes disappear on the TV monitor 10 as shown in FIG. 7B.

In addition, even with the frequency modulation of a pilot signal, the power strength level of the pilot signal does not vary; therefore, it is possible to confirm the abnormality of the pilot signal level through the use of the pilot level detecting circuit 7.

As described above, with the multi-channel video optical transmission systems according to the present invention, a pilot signal is frequency-modulated to modulate the frequency of a distortion occurring at frequencies corresponding to the sum of or difference between the frequencies of the pilot signal and the multi-channel video signal so that the frequency separation or interval between the video carrier and the distortion varies periodically. Accordingly, the angles or the like of the fringes on a TV monitor vary as fast as invisible to the naked eye, which makes the fringes disappear (become invisible).

It should be understood that the present invention is not limited to the above-described embodiments, and that it is intended to cover all changes and modifications of the embodiments of the invention herein which do not constitute departures from the spirit and scope of the invention.

For example, although the above-described embodiments relate to a multi-channel video optical transmission system, the present invention is also applicable to an optical transmitter itself or an optical receiver itself.

What is claimed is:

1. A multi-channel video optical transmission system made to convert a multi-channel video signal into an optical signal in an optical transmitter and transmit the converted optical signal from said optical transmitter though an optical fiber to an optical receiver, said optical transmitter comprising:
pilot signal generating means for generating a pilot signal to be superimposed on said multi-channeJ video signal inputted;
frequency modulating means for modulating said pilot signal superimposed multi-channel video signal into a frequency-modulated signal in batches; and
electrical-optical convening means for converting said frequency-modulated signal into an optical signal and further for putting the converted optical signal out to said optical fiber, said optical receiver comprising:
optical-electrical converting means for receiving said optical signal transmitted through said optical fiber to convert the received optical signal into an electric frequency-modulated signal;
amplifying means for amplifying said frequency-modulated signal obtained by said optical-electrical converting means; and
frequency demodulating means for frequency-demodulating said frequency-modulated signal amplified by said amplifying means into a pilot signal superimposed multi-channel video signal, wherein said pilot signal generating means has a frequency modulation function to modulate a frequency of said pilot signal for modulating a frequency of an interinodulation distortion occurring at frequencies corresponding to the sum of and difference between a frequency of each carrier of said multi-channel video signal and a frequency of said pilot signal whereby inclination angle of stripes on a display screen is varied at a high speed so that the stripes are invisible to the naked eye.

2. A multi-channel video optical transmission system made to convert a multi-channel video signal into an optical signal in an optical transmitter and transmit the convened optical signal from said optical transmitter through an optical fiber to an optical receiver, said optical transmitter comprising:
pilot signal generating means for generating a pilot signal to be superimposed on said multi-channel video signal inputted; and
electrical-optical converting means for converting said pilot signal superimposed multi-channel video signal into an optical signal and Thither for putting the converted optical signal out to said optical fiber, said optical receiver comprising:
optical-electrical converting means for receiving said optical signal transmitted through said optical fiber to convert the received optical signal into an electric signal corresponding to said pilot signal superimposed multi-channel video signal; and
amplifying means for amplifying said electric signal corresponding to said pilot signal superimposed multi-channel video signal obtained by said optical-electrical converting means, wherein said pilot signal generating means has a frequency modulation function to modulate a frequency of said pilot signal for modulating a frequency of an intennodulation distortion occurring at frequencies corresponding to the sum of and difference between a frequency of each carrier of said multi-channel video signal and a frequency of said pilot signal whereby inclination angle of stripes on a display screen is varied at a high speed so that the swipes are invisible to the naked eye.

3. An optical transmitter for use in a multi-channel video optical transmission system, which converts a multi-channel video signal into an optical signal and transmits the convened optical signal through an optical fiber to an optical receiver, said optical transmitter comprising:
- pilot signal generating means for generating a pilot signal to be superimposed on said multi-channel video signal inputted;
- frequency modulating means for modulating said pilot signal superimposed multi-channel video signal into a frequency-modulated signal in batches; and
- electrical-optical converting means for converting said frequency-modulated signal into an optical signal and further for putting the converted optical signal out to said optical fiber, wherein said pilot signal generating means has a frequency modulation function to modulate a frequency of said pilot signal for modulating a frequency of an intermodulation distortion occurring at frequencies corresponding to the sum of and difference between a frequency of each carrier of said multi-channel video signal and a frequency of said pilot signal whereby inclination angle of stripes on a display screen is varied at a high speed so that the stripes are invisible to the naked eye.

4. An optical transmitter for use in a multi-channel video optical transmission system, which converts a multi-channel video signal into an optical signal and transmits the convened optical signal through an optical fiber to an optical receiver, said optical transmitter comprising;
- pilot signal generating means for generating a pilot signal to be superimposed on said multi channel video signal inputted; and
- electrical-optical converting means for converting said pilot signal superimposed multi-channel video signal into an optical signal and further for putting the converted optical signal out to said optical fiber,
- wherein said pilot signal generating means has a frequency modulation function to modulate a frequency of said pilot signal for modulating a frequency of an intermodulation distortion occurring at frequencies corresponding to the sum of and difference between a frequency of each carder of said multi-channel video signal and a frequency of said pilot signal whereby inclination angle of stripes on a display screen is varied at a high speed so that the stripes are invisible to the naked eye.

* * * * *